(12) United States Patent
Xin et al.

(10) Patent No.: US 10,833,906 B2
(45) Date of Patent: Nov. 10, 2020

(54) METHOD OF CONFIGURING SYMBOLS AND DEVICE USING THE SAME AND METHOD OF DEMODULATING DATA AND DEVICE USING THE SAME

(71) Applicant: ZTE CORPORATION, Shenzhen (CN)

(72) Inventors: Yu Xin, Shenzhen (CN); Luanjian Bian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/341,818

(22) PCT Filed: Jul. 20, 2017

(86) PCT No.: PCT/CN2017/093759
§ 371 (c)(1),
(2) Date: Apr. 12, 2019

(87) PCT Pub. No.: WO2018/068552
PCT Pub. Date: Apr. 19, 2018

(65) Prior Publication Data
US 2019/0319826 A1    Oct. 17, 2019

(30) Foreign Application Priority Data
Oct. 14, 2016   (CN) .......................... 2016 1 0900634

(51) Int. Cl.
*H04L 27/26*   (2006.01)
(52) U.S. Cl.
CPC ........ *H04L 27/262* (2013.01); *H04L 27/2605* (2013.01); *H04L 27/2656* (2013.01); *H04L 27/2665* (2013.01)

(58) Field of Classification Search
None
See application file for complete search history.

(56) References Cited

U.S. PATENT DOCUMENTS

| | | | | |
|---|---|---|---|---|
| 7,929,617 B2 * | 4/2011 | Green | ................ | H04L 27/2003 375/259 |
| 8,369,301 B2 * | 2/2013 | Cai | .......................... | H04J 11/00 370/344 |

(Continued)

FOREIGN PATENT DOCUMENTS

| AU | 2018200771 A1 * | 2/2018 | ......... H04L 27/2602 |
|---|---|---|---|
| CN | 102263720 A | 11/2011 | |

(Continued)

OTHER PUBLICATIONS

J. Abdoli, M. Jia and J. Ma, "Filtered OFDM: A new waveform for future wireless systems," 2015 IEEE 16th International Workshop on Signal Processing Advances in Wireless Communications (SPAWC), Stockholm, 2015, pp. 66-70. (Year: 2015).*

(Continued)

*Primary Examiner* — Berhanu Tadese
(74) *Attorney, Agent, or Firm* — Cantor Colburn LLP (57) ABSTRACT

Disclosed are a method of configuring symbols and a device using the same. Through the use of a symbol configuration parameter B which includes K values corresponding to different symbol intervals or symbol numbers respectively, a symbol interval and a number of symbols in a subframe may be configured according to the symbol configuration parameter B. K is an integer greater than 1.

20 Claims, 6 Drawing Sheets

110

Determining the symbol interval T and symbol number N in a subframe by the parameter B; and transforming frequency domain data of the N symbols to a time domain data sequence through an Inverse Fast Fourier Transform (IFFT)

120

Processing the time domain data sequence of the N symbols by a waveform function to form a complete subframe

(56) References Cited

U.S. PATENT DOCUMENTS

| | | | | |
|---|---|---|---|---|
| 8,811,141 B2* | 8/2014 | Cai | .................. | H04J 11/00 |
| | | | | 370/203 |
| 9,544,119 B2* | 1/2017 | Park | .................. | H04L 1/0038 |
| 9,647,865 B1* | 5/2017 | Limberg | .................. | H04L 1/02 |
| 9,942,888 B2* | 4/2018 | Chen | .................. | H04L 27/2613 |
| 10,374,855 B2* | 8/2019 | Kimura | .................. | H04L 27/26 |
| 10,484,216 B2* | 11/2019 | Qian | .................. | H04L 27/2607 |
| 2004/0063399 A1* | 4/2004 | Milbar | .................. | H03M 13/2732 |
| | | | | 455/3.01 |
| 2004/0252775 A1* | 12/2004 | Park | .................. | H04L 27/02 |
| | | | | 375/260 |
| 2005/0058226 A1* | 3/2005 | Niederholz | .................. | H04L 27/1563 |
| | | | | 375/323 |
| 2006/0008033 A1* | 1/2006 | Niederholz | .................. | H04L 27/1563 |
| | | | | 375/341 |
| 2007/0164881 A1* | 7/2007 | Schwartz | .................. | H03M 5/145 |
| | | | | 341/50 |
| 2007/0211786 A1* | 9/2007 | Shattil | .................. | H04J 13/00 |
| | | | | 375/141 |
| 2008/0056390 A1* | 3/2008 | Rainbolt | .................. | H04L 25/0222 |
| | | | | 375/260 |
| 2008/0219339 A1* | 9/2008 | Chrabieh | .................. | H04L 5/0007 |
| | | | | 375/231 |
| 2009/0110033 A1* | 4/2009 | Shattil | .................. | H04J 14/0298 |
| | | | | 375/141 |
| 2011/0141918 A1* | 6/2011 | Li | .................. | H04J 7/00 |
| | | | | 370/252 |
| 2012/0170525 A1* | 7/2012 | Sorrentino | .................. | H04L 5/0023 |
| | | | | 370/329 |
| 2012/0219092 A1* | 8/2012 | Ishihara | .................. | H04W 52/0216 |
| | | | | 375/299 |
| 2012/0250566 A1* | 10/2012 | Wang | .................. | H04W 8/22 |
| | | | | 370/252 |
| 2013/0114509 A1* | 5/2013 | Cai | .................. | H04L 27/2607 |
| | | | | 370/328 |
| 2014/0050149 A1* | 2/2014 | Cai | .................. | H04L 27/2607 |
| | | | | 370/328 |
| 2014/0185578 A1* | 7/2014 | Park | .................. | H04L 1/0038 |
| | | | | 370/329 |
| 2014/0241313 A1* | 8/2014 | Popovic | .................. | H04J 4/00 |
| | | | | 370/330 |
| 2014/0254515 A1* | 9/2014 | Kim | .................. | H04W 74/0833 |
| | | | | 370/329 |
| 2015/0049685 A1* | 2/2015 | Chen | .................. | H04L 27/2613 |
| | | | | 370/329 |
| 2015/0055616 A1* | 2/2015 | Kim | .................. | H04W 56/00 |
| | | | | 370/330 |
| 2015/0250001 A1* | 9/2015 | Tan | .................. | H04N 21/23106 |
| | | | | 370/329 |
| 2015/0256376 A1* | 9/2015 | Limberg | .................. | H04L 27/2646 |
| | | | | 375/261 |
| 2016/0234052 A1* | 8/2016 | Ros | .................. | H04L 1/203 |
| 2017/0156140 A1* | 6/2017 | Islam | .................. | H04L 5/0044 |
| 2017/0257238 A1* | 9/2017 | Qian | .................. | H04L 27/2628 |
| 2017/0318553 A1* | 11/2017 | Chen | .................. | G01S 1/0423 |
| 2017/0353866 A1* | 12/2017 | Gou | .................. | H04L 5/0091 |
| 2018/0110057 A1* | 4/2018 | Park | .................. | H04B 7/0404 |
| 2018/0132244 A1* | 5/2018 | Huang | .................. | H04W 72/0453 |
| 2018/0191483 A1* | 7/2018 | Yamazaki | .................. | H04L 5/0051 |
| 2018/0198205 A1* | 7/2018 | Wang | .................. | H01Q 3/34 |
| 2018/0213530 A1* | 7/2018 | Mochizuki | .................. | H04W 72/0446 |
| 2018/0278291 A1* | 9/2018 | Liu | .................. | H04W 72/04 |
| 2018/0279292 A1* | 9/2018 | Luo | .................. | H04B 7/0452 |
| 2018/0288746 A1* | 10/2018 | Zhang | .................. | H04L 1/0031 |
| 2018/0309496 A1* | 10/2018 | Lee | .................. | H04L 5/0053 |
| 2018/0324850 A1* | 11/2018 | Amuru | .................. | H04L 5/0053 |
| 2018/0332542 A1* | 11/2018 | Wang | .................. | H04L 5/0091 |
| 2018/0359123 A1* | 12/2018 | Kimura | .................. | H04L 27/26 |
| 2018/0368137 A1* | 12/2018 | Yin | .................. | H04L 5/0055 |
| 2019/0007248 A1* | 1/2019 | Takeda | .................. | H04W 72/12 |
| 2019/0020453 A1* | 1/2019 | Xu | .................. | H04L 1/00 |
| 2019/0028312 A1* | 1/2019 | Xin | .................. | H04L 25/03834 |
| 2019/0036750 A1* | 1/2019 | Xin | .................. | H04L 27/264 |
| 2019/0037427 A1* | 1/2019 | Yerramalli | .................. | H04W 24/10 |
| 2019/0045489 A1* | 2/2019 | He | .................. | H04W 72/042 |
| 2019/0053080 A1* | 2/2019 | Ryu | .................. | H04L 5/0053 |
| 2019/0053318 A1* | 2/2019 | Nogami | .................. | H04W 72/042 |
| 2019/0075581 A1* | 3/2019 | Salem | .................. | H04W 16/14 |
| 2019/0082406 A1* | 3/2019 | Akkarakaran | .................. | H04W 72/042 |
| 2019/0082448 A1* | 3/2019 | Nogami | .................. | H04W 72/1263 |
| 2019/0109750 A1* | 4/2019 | Nam | .................. | H04L 5/0012 |
| 2019/0182884 A1* | 6/2019 | Deenoo | .................. | H04L 1/0061 |
| 2019/0215828 A1* | 7/2019 | Kim | .................. | H04W 72/04 |
| 2019/0245731 A1* | 8/2019 | Xin | .................. | H04L 27/0008 |
| 2019/0253300 A1* | 8/2019 | Munier | .................. | H04L 5/0051 |
| 2019/0254026 A1* | 8/2019 | Liu | .................. | H04L 5/0048 |
| 2019/0261354 A1* | 8/2019 | Fakoorian | .................. | H04L 1/1861 |
| 2019/0268084 A1* | 8/2019 | Rosasco | .................. | H04W 56/001 |
| 2019/0268852 A1* | 8/2019 | Ryu | .................. | H04W 52/14 |
| 2019/0306923 A1* | 10/2019 | Xiong | .................. | H04W 72/042 |
| 2019/0312764 A1* | 10/2019 | Xin | .................. | H04L 27/264 |
| 2019/0319826 A1* | 10/2019 | Xin | .................. | H04L 27/262 |
| 2019/0320467 A1* | 10/2019 | Freda | .................. | H04W 74/0833 |
| 2019/0349166 A1* | 11/2019 | Zhang | .................. | H04L 5/0048 |

FOREIGN PATENT DOCUMENTS

| | | | | |
|---|---|---|---|---|
| CN | 102299892 A | | 12/2011 | |
| CN | 105594276 A | | 5/2016 | |
| CN | 106961405 A | * | 7/2017 | ............ H04L 27/00 |
| CN | 107959647 A | * | 4/2018 | ......... H04L 27/2605 |
| WO | WO-2012151948 A1 | * | 11/2012 | ......... H04L 27/2607 |
| WO | 2016114824 A1 | | 7/2016 | |
| WO | WO-2016114824 A1 | * | 7/2016 | ......... H04L 27/2646 |
| WO | WO-2017121410 A1 | * | 7/2017 | ....... H04L 25/03834 |
| WO | WO-2018028252 A1 | * | 2/2018 | ........ H04W 72/0446 |
| WO | WO-2018068552 A1 | * | 4/2018 | ......... H04L 27/2607 |
| WO | WO-2019012562 A1 | * | 1/2019 | ......... H04L 27/2634 |

OTHER PUBLICATIONS

WO/2012/151948 (Machine Translated) (Year: 2012).*
PCT-CN2017-093759 (WO2018068552A)—Machine Translated (Year: 2018).*
English Translation of International Search Report for International Application No. PCT/CN2017/093759 dated Nov. 9, 2017, 2 pages.

* cited by examiner

METHOD OF CONFIGURING SYMBOLS AND DEVICE USING THE SAME AND METHOD OF DEMODULATING DATA AND DEVICE USING THE SAME

CROSS-REFERENCE TO RELATED APPLICATIONS

The present application is based upon and claims priority to PCT Application No. PCT/CN2017/093759, filed on Jul. 20, 2017, which further is based upon and claims priority to Chinese Patent Application No. 201610900634.1, filed Oct. 14, 2016, the entire content of which is hereby incorporated by reference.

TECHNICAL FIELD

The present disclosure relates to but is not limited to the field of communication, and particularly relates to a method of configuring symbols and a device using the same, and a method of demodulating data and a device using the same.

BACKGROUND

The Long Term Evolution (LTE) technology is a Fourth Generation (4G) wireless cellular communication technology. LTE adopts Orthogonal Frequency Division Multiplexing (OFDM) technology, time-frequency resources constructed by subcarriers and OFDM symbols constitute wireless physical time-frequency resources of the LTE system. At present, OFDM technology has been widely used in wireless communication. Cyclic Prefix Orthogonal Frequency Division Multiplexing (CP-OFDM) applied in LTE systems has good performance. However, the spectrum leakage of CP-OFDM is large, and the use of CP reduces spectral efficiency to some extent. Thus, new waveform techniques for suppressing out-of-band leakage have been extensively studied. Most new waveform technologies often need to be configured with their corresponding OFDM symbol intervals, but at present, there is no technical scheme suitable for the new waveform technology and compatible with the LTE system, for reference.

SUMMARY

The following is a summary of the subject particularly described in this disclosure. This summary is not intended to limit the scope of the claims.

In order to at least partially overcome the problem in the related technology, embodiments of the present disclosure provide a method of configuring symbols and a device using the same, and a method of demodulating data and a device using the same.

According to the first aspect of the present disclosure, there is provided a method of configuring symbols, which is applied to a transmitting node, and includes:

configuring a symbol interval and a symbol number in a subframe according to a symbol configuration parameter B, wherein the parameter B includes K values, the K values of the parameter B correspond to different symbol intervals or symbol numbers respectively, and K is an integer greater than 1.

According to the second aspect of the present disclosure, there is provided a method of demodulating data, which includes:

receiving modulated data transmitted by a transmitting node; and according to a value of a symbol configuration parameter B, determining a symbol interval and a symbol number in a subframe, and demodulating the received data.

According to the third aspect of the present disclosure, there is provided a device of configuring symbols, which includes: a processor; and a memory configured to store instructions executable by the processor, wherein the processor is configured to:

configure a symbol interval and a symbol number in a subframe according to a symbol configuration parameter B, wherein the parameter B includes K values, the K values of the parameter B correspond to different symbol intervals or symbol numbers respectively, and K is an integer greater than 1.

According to the fourth aspect of the present disclosure, there is provided a device of demodulating data, which includes: a processor; and a memory configured to store instructions executable by the processor, wherein the processor is configured to:

receive modulated data transmitted by a transmitting node; and according to a value of a symbol configuration parameter B, determine a symbol interval and a symbol number in a subframe, and demodulate the received data.

According to the fifth aspect of the present disclosure, there is provided a transmitting node, which includes: a processor; and a memory configured to store instructions executable by the processor, wherein the processor is configured to:

configure a symbol interval and a symbol number in a subframe according to a symbol configuration parameter B, wherein the parameter B includes K values, the K values of the parameter B correspond to different symbol intervals or symbol numbers respectively, and K is an integer greater than 1.

According to the six aspect of the present disclosure, there is provided a receiving node, which includes: a processor; and a memory configured to store instructions executable by the processor, wherein the processor is configured to:

receive modulated data transmitted by a transmitting node; and according to a value of a symbol configuration parameter B, determine a symbol interval and a symbol number in a subframe, and demodulate the received data.

According to the technical solutions of the embodiments of the present disclosure, a symbol interval and a symbol number in a subframe is configured according to a symbol configuration parameter B, wherein the parameter B includes K values, the K values of the parameter B correspond to different symbol intervals or symbol numbers respectively. In this way, the symbol intervals and the symbol numbers may be flexibly configured to adapt to different waveform technologies and different scenarios, and may be compatible and applied to the LTE system.

Upon reading and understanding the drawings and detailed description, one will understand other aspects as well.

DETAILED DESCRIPTION

In order to have a more detailed understanding of features and technical contents of embodiments of the present disclosure, the realization of the embodiments of the present disclosure will be described below with reference to drawings. The attached drawings are for reference only and are not intended to limit the embodiments of the present disclosure.

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

An embodiment of the present disclosure provides a method of configuring symbols, applied to a transmitting node, including:

configuring a symbol interval and a symbol number in a subframe according to a symbol configuration parameter B, wherein the parameter B contains K values, K is an integer great than 1, and the K values of the parameter B correspond to different symbol intervals or symbol numbers respectively.

In the embodiment of the present disclosure, the transmitting node is any transmitting device including a base station, a terminal, a relay, a transmitting point, etc.

The symbol interval T and symbol number N in a subframe are determined by the parameter B, wherein N is a positive integer. Frequency domain data of the N symbols is transformed to a time domain data sequence through an Inverse Fast Fourier Transform (IFFT) operation. The time domain data sequence of the N symbols is processed by a waveform function to form a complete subframe.

According to the value of the parameter B, the symbol intervals or symbol numbers configured in different subframes are the same to or different from each other.

According to the value of the parameter B, with regard to different users, the symbol intervals or symbol numbers configured in a subframe are the same to or different from each other.

According to the value of the parameter B, with regard to different subbands, the symbol intervals or symbol numbers configured in a subframe are the same to or different from each other.

When the values of the parameter B are different from each other, the symbol intervals or the symbol numbers are configured to be different from each other.

When the transmitting node is an uplink transmitting node, the uplink transmitting node receives information containing the symbol configuration parameter B, sent by a downlink transmitting node.

When the transmitting node is a downlink transmitting node, the value of the symbol configuration parameter B is sent to a receiving node.

An embodiment of the present disclosure further provides a method of demodulating data, applied to a receiving node, including:

receiving modulated data transmitted by a transmitting node, wherein the transmitting node, according to any one of the methods of modulating data mentioned in the first invention, configures the symbol interval and symbol number in a subframe according to the symbol configuration parameter B, and then forms data of the subframe and transmits it.

according to a value of the symbol configuration parameter B, determining the symbol interval and the symbol number in the subframe, and demodulating the received data.

When the receiving node is a downlink receiving node, the downlink receiving node receives information sent by a downlink transmitting node, wherein the information contains the value of the symbol configuration parameter B.

The embodiments of the present disclosure are described in detail below with reference to the drawings. It should be understood that, if there is no conflict, the embodiments and features therein in the present disclosure may be combined with each other.

First Embodiment

The spectrum leakage of CP-OFDM is large, thus, new waveform techniques for suppressing out-of-band leakage have been extensively studied. Most new waveform techniques often need to configure their corresponding OFDM symbol intervals, and different OFDM symbol interval configurations may be adapted to different application scenarios. An embodiment of the present disclosure provides a method of flexibly configuring the OFDM symbol interval to adapt to different new waveform technologies and scene requirements. In the embodiment of the present disclosure, the transmitting end of a system includes a transmitting device such as a base station, a terminal, a relay, a transmitting point, etc., which are collectively referred to as a transmitting node in the embodiment of the present disclosure.

Communication systems to which the embodiment of the present disclosure is applied include, but are not limited to, systems that use a plurality of subcarriers to transmit data, such as an OFDM system.

Figure 1:
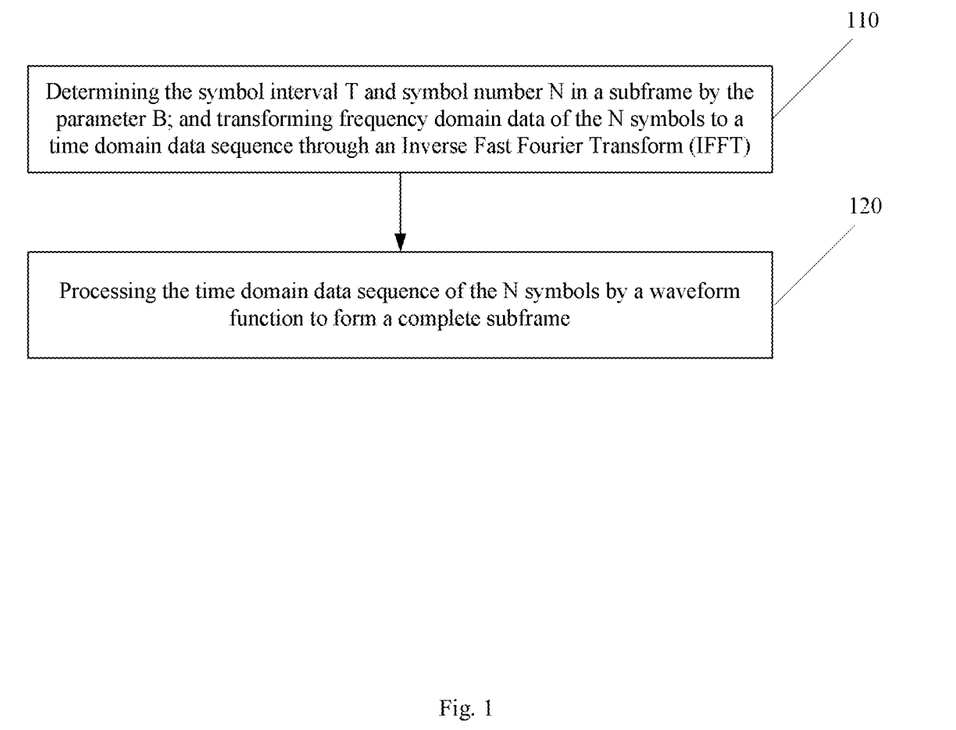
FIG. 1 is a flowchart showing a method of configuring symbols according to an example of the present disclosure.

FIG. 1 is a flowchart showing a method of configuring symbols according to the example of the present disclosure. As shown in FIG. 1, the method of configuring OFDM symbol interval of the embodiment, applied to a transmitting node, includes the following steps.

In step 110, the symbol interval T and symbol number N in a subframe are determined by the parameter B, wherein N is a positive integer. Frequency domain data of the N symbols is transformed to a time domain data sequence through an Inverse Fast Fourier Transform (IFFT) operation.

In the embodiment of the present disclosure, the parameter B contains K values, K is an integer great than 1, and the K values of the parameter B correspond to different symbol intervals or symbol numbers respectively.

In the embodiment of the present disclosure, the symbol configuration parameter B is a generation name. The symbol configuration parameter B may be a parameter directly indicating the symbol interval and the symbol number, and the value of the parameter directly specifies the symbol interval and the symbol number in a subframe. In addition, the symbol configuration parameter B may be a parameter indirectly indicating the symbol interval and the symbol number as well, and the value of the parameter specifies other content, but indirectly corresponds to the symbol interval and the symbol number in a subframe. The parameters in these two cases are collectively referred to as the symbol configuration parameter B in the embodiment of the present disclosure.

In this embodiment of the present invention, the duration of the subframe is a unit time length of the communication system. The unit time length may be one subframe, or may be a Transmission Time Interval (TTI), or may be another time conception defined by the communication system. The unit time length may be fixed or varied. The unit time length is simply referred to collectively as a subframe in the embodiment of the present disclosure.

In a subframe, there is no necessary connection between the size of the symbol interval and the symbol number. When the symbol interval configurations are not the same, the symbol number configurations may be the same to or different from each other, and the size of the symbol interval and the symbol number are determined by the parameter B.

In the embodiment of the present disclosure, the symbol interval T in the subframe is a constant or an array containing N−1 elements. In a subframe, when the intervals of the N symbols are equal to each other, the symbol intervals T are a constant. In a subframe, when the intervals of the N symbols are not equal to each other, the symbol intervals T are the array containing the N−1 elements.

In the embodiment of the present disclosure, when the transmitting node is an uplink transmitting node, the uplink transmitting node receives information that is sent by a downlink transmitting node, and the information contains the value of the symbol configuration parameter B.

In the embodiment of the present disclosure, when the transmitting node is a downlink transmitting node, the downlink transmitting node sends information to a receiving node, and the information contains the value of the symbol configuration parameter B.

In step 120, the time domain data sequence of the N symbols is processed by a waveform function to form a complete subframe.

In the embodiment of the present disclosure, according to the value of the parameter B, the symbol intervals or symbol numbers configured in different subframes are the same to or different from each other. For example, according to the value of the parameter B, the sizes of symbol intervals of the same user in different subframes may be flexibly configured. Similarly, according to the value of the parameter B, the sizes of symbol intervals of different users in different subframes may be flexibly configured.

In the embodiment of the present disclosure, according to the value of the parameter B, with regard to different users, the symbol intervals or symbol numbers configured in a subframe are the same to or different from each other. For example, according to the value of the parameter B, with regard to different users in the same subband of the same subframe, the sizes of the symbol intervals may be flexibly configured. Similarly, according to the value of the parameter B, with regard to different users in different subbands of the same subframe, the sizes of the symbol intervals may be flexibly configured.

In the embodiment of the present disclosure, according to the value of the parameter B, with regard to different subbands, the symbol intervals or symbol numbers configured in a subframe are the same to or different from each other. For example, according to the value of the parameter B, with regard to different subbands in the same subframe, the sizes of the symbol intervals may be flexibly configured.

The subband includes m subcarriers, wherein m is an integer greater than or equal to 1.

When the values of the parameter B are different from each other, the symbol intervals or the symbol numbers are configured to be different from each other. The value of the parameter B may be configured accordingly depending on different waveform functions or scene requirements. When the waveform function or the application scenario is unchanged, the value of the parameter B remains unchanged, and the symbol intervals or the symbol numbers are configured to be the same to each other. When the waveform function or the application scenario changes, and there are different requirements for the symbol intervals before and after the change, the value of the parameters B are different from each other, thus the symbol intervals or the symbol numbers are configured to be different from each other.

In the embodiment of the present disclosure, in a subframe, time domain data sequences of adjacent symbols may have a head-to-tail overlap. According to different waveform functions or scene requirements, in a subframe, when a symbol duration is greater than a symbol interval, time domain data sequences of adjacent symbols have a head-to-tail overlap; and when the symbol duration is equal to the symbol interval, the time domain data sequences of adjacent symbols do not have a head-to-tail overlap.

Second Embodiment

Figure 2:
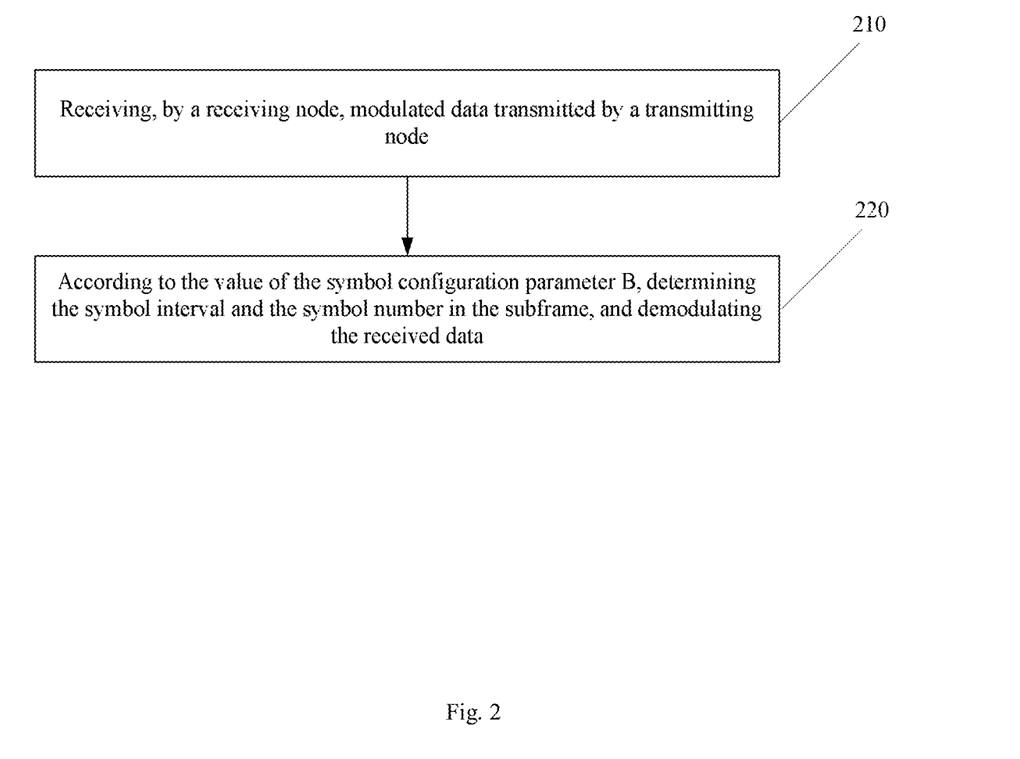
FIG. 2 is a flowchart showing a method of demodulating data according to an example of the present disclosure.

FIG. 2 is a flowchart showing a method of demodulating data according to an example of the present disclosure. As shown in FIG. 2, the method of demodulating data in the embodiment of the present disclosure, applied to a receiving node, includes the following steps.

In step 210, modulated data transmitted by a transmitting node is received by a receiving node.

In the embodiment of the present disclosure, the transmitting node modulates the data to be transmitted, according to the method of configuring symbols mentioned in the First Embodiment, wherein, according to the symbol configuration parameter B, the symbol interval and symbol number in a subframe are configured, and then forms data of the subframe and transmits it.

In step 220, according to the value of the symbol configuration parameter B, the symbol interval and the symbol number in the subframe are determined, and the received data is demodulated.

In the embodiment of the present disclosure, when the receiving node is a downlink receiving node, the downlink receiving node receives information sent by a downlink transmitting node, wherein the information contains the value of the symbol configuration parameter B.

In the embodiment of the present disclosure, when the receiving node is an uplink receiving node, the uplink receiving node has saved information about uplink data, wherein the information contains the value of the symbol configuration parameter B.

In the embodiment of the present disclosure, according to different scene requirements, by setting the value of OFDM symbol configuration parameter B, the symbol interval and the symbol number in a subframe may be flexibly configured. For example, for a scenario where the multipath delay is relatively large, CP-OFDM and the corresponding symbol intervals may be selected to resist multipath and time deviation; for scenarios that are very sensitive to adjacent-channel interference, Filter Bank Orthogonal Frequency Division Multiplexing (FB-OFDM) and the corresponding symbol intervals may be selected to reduce out-of-band leakage; for a FB-OFDM scenario with good channel condition, the symbol interval may be reduced, and the symbol number in a subframe may be increased to improve spectrum utilization efficiency; for a FB-OFDM scenario with poor channel condition, the symbol interval may be increased to reduce inter-frame interference; and in addition, other waveform technique such as Weighted Cyclic Prefix OFDM (WCP-OFDM), Filtered Orthogonal Frequency Division Multiplexing (F-OFDM), etc., may be selected to configure their corresponding symbol intervals.

Figure 3:
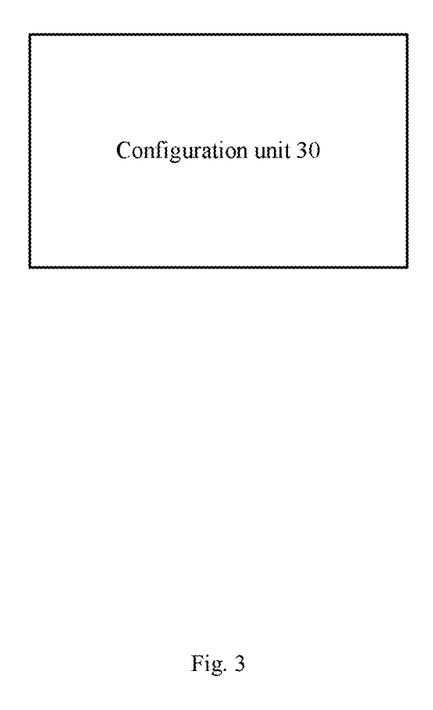
FIG. 3 is a schematic diagram of the composition of a device of configuring symbols according to an example of the present disclosure.

FIG. 3 is a schematic diagram of the composition of a device of configuring symbols according to an example of the present disclosure. As shown in FIG. 3, the device of configuring symbols in the embodiment of the present disclosure includes a configuration unit 30.

The configuration unit 30 is configured to, according to the symbol configuration parameter B, configure a symbol interval and a symbol number in a subframe, wherein the parameter B includes K values, the K values of the parameter B corresponds to different symbol intervals or symbol numbers respectively, and K is an integer greater than 1.

In the embodiment of the present disclosure, the configuration unit 30 is further configured to:

according to the value of the parameter B, configure the same or different symbol intervals in different subframes; and according to the value of the parameter B, configure the same or different symbol numbers in different subframes.

In the embodiment of the present disclosure, the configuration unit 30 is further configured to:

according to the value of the parameter B, with regard to different subframes of the same user in the same subband, configure the same or different symbol intervals; and with regard to different subframes of different users, configure the same or different symbol intervals; and according to the value of the parameter B, with regard to different subframes of the same user in the same subband, configure the same or different symbol numbers; and with regard to different subframes of different users, configure the same or different symbol numbers.

In the embodiment of the present disclosure, the configuration unit 30 is further configured to:

according to the value of the parameter B, with regard to different users, configure the same or different symbol intervals in a subframe; and according to the value of the parameter B, with regard to different users, configure the same or different symbol numbers in a subframe.

In the embodiment of the present disclosure, the configuration unit 30 is further configured to:

according to the value of the parameter B, with regard to different users of the same subframe and the same subband, configure the same or different symbol intervals; and with regard to different users of the same subframe and the different subband, configure the same or different symbol intervals; and according to the value of the parameter B, with regard to different users of the same subframe and the same subband, configure the same or different symbol numbers; and with regard to different users of the same subframe and the different subband, configure the same or different symbol numbers.

In the embodiment of the present disclosure, the configuration unit 30 is further configured to:

according to the value of the parameter B, with regard to different subbands, configure the same or different symbol intervals in a subframe; and according to the value of the parameter B, with regard to different subbands, configure the same or different symbol numbers in a subframe.

In the embodiment of the present disclosure, the configuration unit 30 is further configured to:

according to the value of the parameter B, determine the symbol number of in a subframe to be N, wherein N is a positive integer; and transform, through an Inverse Discrete Fourier Transform, frequency domain data of the N symbols respectively to form a time domain data sequence; and process, by a waveform function, the time domain data sequence of the N symbols to form a complete subframe.

It should be understood by those skilled in the art that the implementation functions of the units in the symbol configuration apparatus shown in FIG. 3 may be understood by referring to the related description of the foregoing method of configuring symbols. The configuration unit 30 shown in FIG. 3 may be implemented by a microprocessor, an FPGA, a digital signal processor, or the like.

Figure 4:
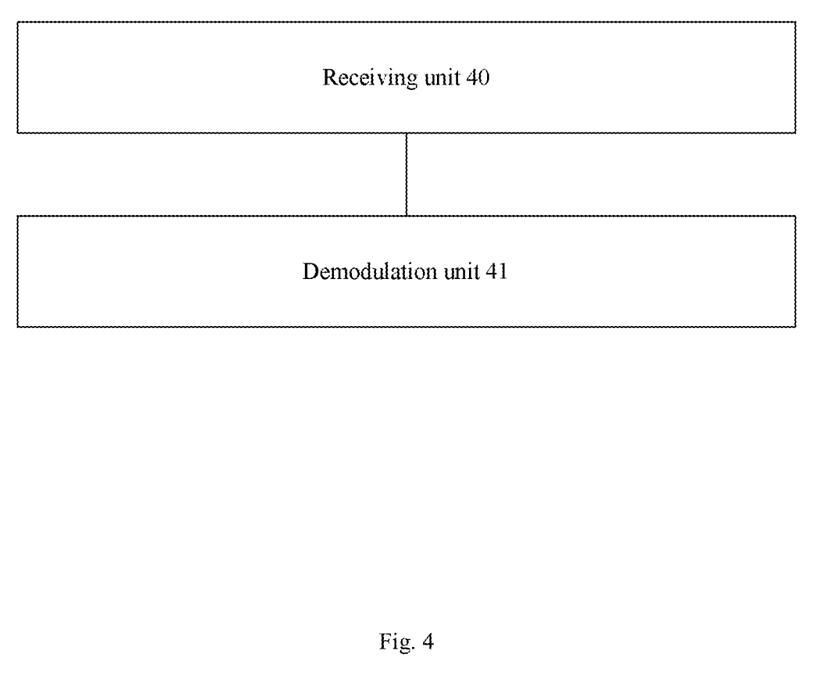
FIG. 4 is a schematic diagram of the composition of a device of demodulating data according to an example of the present disclosure.

FIG. 4 is a schematic diagram of the composition of a device of demodulating data according to an example of the present disclosure. As shown in FIG. 4, the device of demodulating data in the embodiment of the present disclosure includes: a receiving unit 40 and a demodulation unit 41.

The receiving unit 40 is configured to receive modulated data transmitted by a transmitting node, wherein the transmitting node, based on the method of configuring symbols described in the First Embodiment, configures the symbol interval and symbol number in a subframe according to the symbol configuration parameter B, and then forms data of the subframe and transmits it.

The demodulation unit 41 is configured to, according to the value of the symbol configuration parameter B, determine the symbol interval and the symbol number in a subframe, and demodulate the received data.

The receiving unit is further configured to:

receive information transmitted by a downlink transmitting node, wherein the information contains the value of the symbol configuration parameter B.

It should be understood by those skilled in the art that the implementation functions of the units in the symbol configuration apparatus shown in FIG. 4 may be understood by referring to the related description of the foregoing method of configuring symbols. The receiving unit 40 shown in FIG. 4 may be implemented by an antenna system, and the demodulating unit 41 may be implemented by a demodulator or the like.

Figure 5:
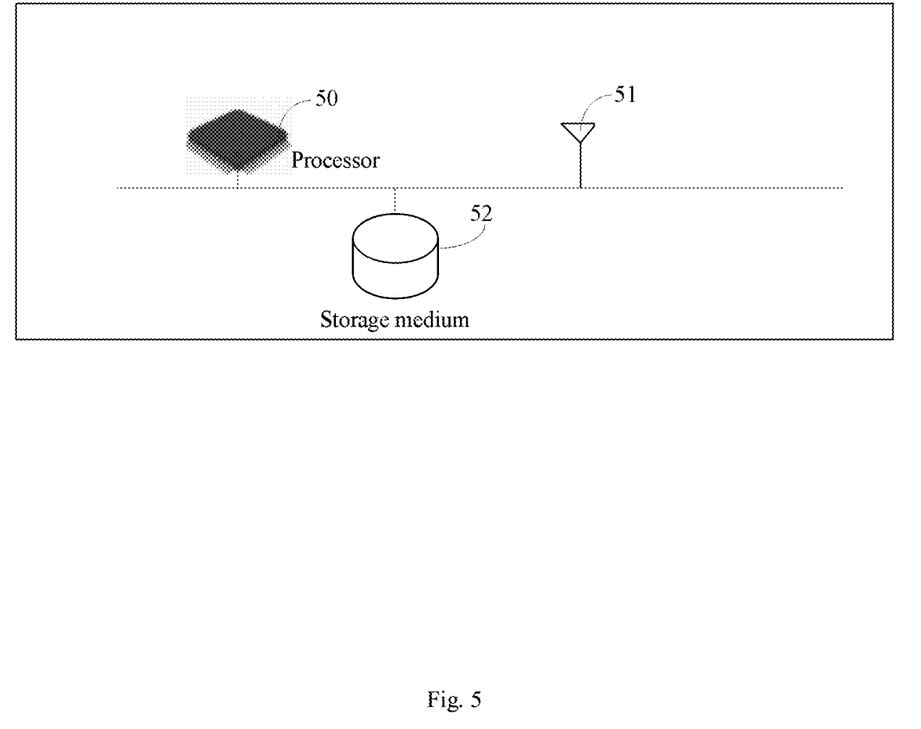
FIG. 5 is a schematic diagram of the composition of a transmitting node according to an example of the present disclosure.

FIG. 5 is a schematic diagram of the composition of a transmitting node according to an example of the present disclosure. As shown in FIG. 5, the transmitting node in the embodiment of the present disclosure includes a processor 50, an antenna 51 and a storage medium 52, etc., wherein the processor 50 is configured to, according to the symbol configuration parameter B, configure a symbol interval and a symbol number in a subframe, wherein the parameter B includes K values, the K values of the parameter B corresponds to different symbol intervals or symbol numbers respectively, and K is an integer greater than 1.

The processor 50 is further configured to:

according to the value of the parameter B, configure the same or different symbol intervals in different subframes; and according to the value of the parameter B, configure the same or different symbol numbers in different subframes.

The processor 50 is further configured to:

according to the value of the parameter B, with regard to different subframes of the same user in the same subband, configure the same or different symbol intervals; and with regard to different subframes of different users, configure the same or different symbol intervals; and according to the value of the parameter B, with regard to different subframes of the same user in the same subband, configure the same or different symbol numbers; and with regard to different subframes of different users, configure the same or different symbol numbers.

It should be understood by those skilled in the art that the transmitting node shown in FIG. 5 may be a network element such as a base station or a relay station, and other components may be included in the transmitting node as well, the structure of which is not fully shown in FIG. 5, and only related components are schematically shown.

Figure 6:
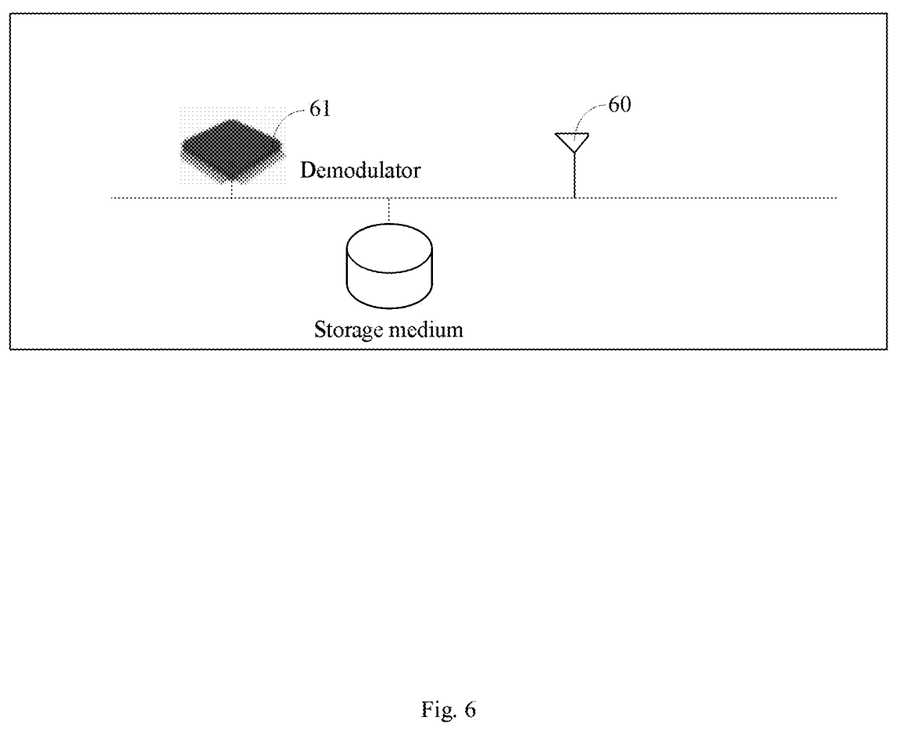
FIG. 6 is a schematic diagram of the composition of a receiving node according to an example of the present disclosure.

FIG. 6 is a schematic diagram of the composition of a receiving node according to an example of the present disclosure. As shown in FIG. 6, the receiving node in the embodiment of the present disclosure includes: an antenna 60 and a demodulator 61.

The antenna 60 is configured to receive modulated data transmitted by a transmitting node, wherein, the transmitting node, configures the symbol interval and symbol number in a subframe according to the symbol configuration parameter B, and then forms data of the subframe and transmits it, wherein the parameter B includes K values, the K values of the parameter B corresponds to different symbol intervals or symbol numbers respectively, and K is an integer greater than 1.

The demodulator 61 is configured to, according to the value of the symbol configuration parameter B, determine the symbol interval and the symbol number in the subframe, and demodulate the received data.

The antenna 60 is further configured to:

receive information transmitted by a downlink transmitting node, where the information comprises the value of the symbol configuration parameter B.

It should be understood by those skilled in the art that the receiving node shown in FIG. 6 may be a terminal or the like, and the receiving node may further include other components such as a processor, a modulator, and the like, the structure of which is not fully shown in FIG. 6, and only related components are schematically shown.

In the embodiments provided by the present application, it should be understood that the disclosed systems, apparatuses and methods may be implemented in other ways. The apparatus embodiments described above are merely illustrative. For example, the division of the units is only a kind of logical function division. In practice, other division manner may be used. For example, a plurality of units or components may be combined or integrated into another system, or some features may be ignored or not performed. In addition, the illustrated or discussed mutual coupling or direct coupling or communication connection may be indirect coupling or communication connection through some interfaces, apparatuses or units, and may be in electrical, mechanical or other forms.

The units described as separated parts may or may not be physically separated, and the parts displayed as units may or may not be physical units, that is, may be located in one place, or may be distributed on a plurality of network units. Some or all of the units may be selected according to actual needs to achieve the objectives of the solutions in the embodiments.

In addition, the respective functional units in the respective embodiments of the present application may be integrated in one processing unit, or the respective units may exist separately, or two or more units may be integrated into one unit, and the above integrated units can be implemented in the form of hardware or in the form of hardware plus software functional units.

A person skilled in the art should understand that all or part of the steps of implementing the above method embodiments may be completed by using hardware related to program instructions. The foregoing program may be stored in a computer readable storage medium, and when it is executed, it performs the steps including the above method embodiment. The foregoing storage medium includes various medias that can store program code, such as removable storage devices, Read Only Memory (ROM), diskettes, optical disks, etc.

If the above units integrated in the embodiments of the present disclosure is implemented in the form of a software functional unit and sold or used as a separate product, they may be stored in a computer-readable storage medium. Based on such understanding, the technical solutions of the embodiments of the present disclosure may be embodied in the form of a software product. The computer software product is stored in storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes, such as a USB disk, a mobile hard disk, a Read-Only Memory (ROM), a Random Access Memory (RAM), a magnetic disk or an optical disk, and the like.

The above mentioned is only the implementation manners of the present disclosure, but the protection scope of this application is not limited to this. Any modifications and substitutions made by the skilled in the art in the scope of the present disclosure shall all fall within the scope of protection of the present disclosure. Therefore, the scope of protection of the present application should be determined by the scope of the claims.

INDUSTRIAL APPLICABILITY

According to the technical solutions of the embodiments of the present disclosure, a symbol interval and a symbol number in a subframe is configured according to a symbol configuration parameter B, wherein the parameter B includes K values, the K values of the parameter B correspond to different symbol intervals or symbol numbers respectively. Through the embodiments of the present disclosure, the symbol intervals and the symbol numbers may be flexibly configured to adapt to different waveform technologies and different scenarios, and may be compatible and applied to the LTE system.

What is claimed is:

1. A method of configuring symbols, applied to a transmitting node, comprising:
    configuring a symbol interval and a number of symbols in a subframe according to a symbol configuration parameter B, wherein the parameter B is configured to indicate the symbol interval and the number of symbols and comprises K values, the K values of the parameter B correspond to different symbol intervals or numbers of symbols respectively, and K is an integer greater than 1;
    further comprising:
    configuring a same symbol interval or different symbol intervals in different subframes according to the K values of the parameter B; and
    configuring a same number of symbols or different numbers of symbols in different subframes according to the K values of the parameter B.

2. The method according to claim 1, further comprising:
    according to the K values of the parameter B, with regard to different subframes of a same user in a same subband, configuring the same symbol interval or the different symbol intervals; and with regard to different subframes of different users, configuring the same symbol interval or the different symbol intervals; and
    according to the K values of the parameter B, with regard to different subframes of the same user in the same subband, configuring the same number of symbols or the different numbers of symbols; and with regard to different subframes of different users, configuring the same number of symbols or the different numbers of symbols.

3. The method according to claim 1, further comprising:
    according to the K values of the parameter B, with regard to different users, configuring a same symbol interval or different symbol intervals in the subframe; and
    according to the K values of the parameter B, with regard to different users, configuring a same number of symbols or different numbers of symbols in the subframe.

4. The method according to claim 3, further comprising:
    according to the K values of the parameter B, with regard to different users of a same subframe and a same subband, configuring the same symbol interval or the different symbol intervals; and with regard to different users of the same subframe and different subbands, configuring the same symbol interval or the different symbol intervals; and according to the K values of the parameter B, with regard to different users of the same subframe and the same subband, configuring the same number of symbols or the different numbers of symbols; and with regard to different users of the same subframe and the different subbands, configuring the same number of symbols or the different numbers of symbols.

5. The method according to claim 1, further comprising:
    according to the K values of the parameter B, with regard to different subbands, configuring a same symbol interval or different symbol intervals in the subframe; and
    according to the K values of the parameter B, with regard to different subbands, configuring a same number of symbols or different numbers of symbols in the subframe.

6. The method according to claim 1, wherein, in the step of configuring a symbol interval and a number of symbols in a subframe according to a symbol configuration parameter B, the number of symbols in the subframe is determined to be N according to the K values of the parameter B, N is a positive integer, and
    the method further comprises:
    transforming frequency domain data of the N symbols to a time domain data sequence through an Inverse Fast Fourier Transform respectively; and
    processing the time domain data sequence of the N symbols by a waveform function to form a complete subframe;
    wherein the waveform function comprises one of: a Cyclic Prefix Orthogonal Frequency Division Multiplexing waveform function, a Filter Bank Orthogonal Frequency Division Multiplexing waveform function, a Weighted Cyclic Prefix Orthogonal Frequency Division Multiplexing waveform function, or a Filtered Orthogonal Frequency Division Multiplexing waveform function.

7. A method of demodulating data, comprising:
    receiving modulated data transmitted by a transmitting node; and
    according to a value of a symbol configuration parameter B, determining a symbol interval and a number of symbols in a subframe, and demodulating the received data;
    wherein the parameter B is configured to indicate the symbol interval and the number of symbols;
    wherein a same symbol interval or different symbol intervals in different subframes is configured according to the value of the parameter B; and
    a same number of symbols or different numbers of symbols in different subframes is configured according to the value of the parameter B.

8. The method according to claim 7, further comprising:
    receiving information transmitted by a downlink transmitting node, wherein the information comprises the value of the symbol configuration parameter B.

9. A device of configuring symbols, comprising:
    a configuration unit, configured to configure a symbol interval and a number of symbols in a subframe according to a symbol configuration parameter B, wherein the parameter B is configured to indicate the symbol interval and the number of symbols and comprises K values, the K values of the parameter B correspond to different symbol intervals or numbers of symbols respectively, and K is an integer greater than 1;

wherein the configuration unit is further configured to:
configure a same symbol interval or different symbol intervals in different subframes according to the K values of the parameter B; and
configure a same number of symbols or different numbers of symbols in different subframes according to the K values of the parameter B.

10. The device according to claim 9, wherein the configuration unit is further configured to:
according to the K values of the parameter B, with regard to different subframes of a same user in a same subband, configure the same symbol interval or the different symbol intervals; and with regard to different subframes of different users, configure the same symbol interval or the different symbol intervals; and
according to the K values of the parameter B, with regard to different subframes of the same user in the same subband, configure the same number of symbols or the different numbers of symbols; and with regard to different subframes of different users, configure the same number of symbols or the different numbers of symbols.

11. The device according to claim 9, wherein the configuration unit is further configured to:
according to the K values of the parameter B, with regard to different users, configure a same symbol interval or different symbol intervals in the subframe; and
according to the K values of the parameter B, with regard to different users, configure a same number of symbols or different numbers of symbols in the subframe.

12. The device according to claim 11, wherein the configuration unit is further configured to:
according to the K values of the parameter B, with regard to different users of a same subframe and a same subband, configure the same symbol interval or the different symbol intervals; and with regard to different users of the same subframe and different subbands, configure the same symbol interval or the different symbol intervals; and
according to the K values of the parameter B, with regard to different users of the same subframe and the same subband, configure the same number of symbols or the different numbers of symbols; and with regard to different users of the same subframe and the different subbands, configure the same number of symbols or the different numbers of symbols.

13. The device according to claim 9, wherein the configuration unit is further configured to:
according to the K values of the parameter B, with regard to different subbands, configure a same symbol interval or different symbol intervals in the subframe; and
according to the K values of the parameter B, with regard to different subbands, configure a same number of symbols or different numbers of symbols in the subframe.

14. The device according to claim 9, wherein the configuration unit is further configured to:
determine the number of symbols in the subframe to be N according to the K values of the parameter B, wherein N is a positive integer; and transform frequency domain data of the N symbols to a time domain data sequence through an Inverse Fast Fourier Transform respectively; and
process the time domain data sequence of the N symbols by a waveform function to form a complete subframe;
wherein the waveform function comprises one of: a Cyclic Prefix Orthogonal Frequency Division Multiplexing waveform function, a Filter Bank Orthogonal Frequency Division Multiplexing waveform function, a Weighted Cyclic Prefix Orthogonal Frequency Division Multiplexing waveform function, or a Filtered Orthogonal Frequency Division Multiplexing waveform function.

15. A device of demodulating data, comprising:
a receiving unit, configured to receive modulated data transmitted by a transmitting node; and
a demodulation unit, configured to, according to a value of a symbol configuration parameter B, determine a symbol interval and a number of symbols in a subframe, and demodulate the received data;
wherein the parameter B is configured to indicate the symbol interval and the number of symbols;
wherein a same symbol interval or different symbol intervals in different subframes is configured according to the value of the parameter B; and
a same number of symbols or different numbers of symbols in different subframes is configured according to the value of the parameter B.

16. The device according to claim 15, wherein the receiving unit is further configured to:
receive information transmitted by a downlink transmitting node, wherein the information comprises the value of the symbol configuration parameter B.

17. A transmitting node, comprising:
a processor, configured to configure a symbol interval and a number of symbols in a subframe according to a symbol configuration parameter B, wherein the parameter B is configured to indicate the symbol interval and the number of symbols and comprises K values, the K values of the parameter B correspond to different symbol intervals or numbers of symbols respectively, and K is an integer greater than 1;
wherein the processor is further configured to:
configure a same symbol interval or different symbol intervals in different subframes according to the K values of the parameter B; and
configure a same number of symbols or different numbers of symbols in different subframes according to the K values of the parameter B.

18. The transmitting node according to claim 17, wherein the processor is further configured to:
according to the K values of the parameter B, with regard to different subframes of a same user in a same subband, configure the same symbol interval or the different symbol intervals; and with regard to different subframes of different users, configure the same symbol interval or the different symbol intervals; and
according to the K values of the parameter B, with regard to different subframes of the same user in the same subband, configure the same number of symbols or the different numbers of symbols; and with regard to different subframes of different users, configure the same number of symbols or the different numbers of symbols.

19. A receiving node, comprising:
an antenna, configured to receive modulated data transmitted by a transmitting node; and
a demodulator, configured to, according to a value of a symbol configuration parameter B, determine a symbol interval and a number of symbols in a subframe, and demodulate the received data;
wherein the parameter B is configured to indicate the symbol interval and the number of symbols;

wherein a same symbol interval or different symbol intervals in different subframes is configured according to the value of the parameter B; and a same number of symbols or different numbers of symbols in different subframes is configured according to the value of the parameter B.

20. The receiving node according to claim 19, wherein the antenna is further configured to:

receive information transmitted by a downlink transmitting node, wherein the information comprises the value of the symbol configuration parameter B.

\* \* \* \* \*